United States Patent [19]

Tsygankov et al.

[11] Patent Number: 4,844,552
[45] Date of Patent: Jul. 4, 1989

[54] BICYCLE WHEEL

[76] Inventors: Anatoly S. Tsygankov, ulitsa Profsojuznaya, 140, korpus 2, kv. 239; Igor N. Kovalev, ulitsa Katukova, 2, kv. 76; Igor V. Voskresensky, Smolensky bulvar, 69, kv. 142; Ellen A. Evstafieva, ulitsa Akademika Anokhina, 30, korpus 2, kv. 239; Anatoly I. Rozhkov, ulitsa Ryabinovaya, 8, kv. 116, all of Moscow, U.S.S.R.

[21] Appl. No.: 77,894

[22] Filed: Jul. 27, 1987

[51] Int. Cl.$^4$ .............................................. B60B 3/08
[52] U.S. Cl. ........................... 301/63 DD; 301/63 PW; 301/105 B
[58] Field of Search .................. 301/54, 55, 58, 59, 301/63 PW, 105 R, 105 B, 63 DD

[56] References Cited

U.S. PATENT DOCUMENTS

| 375,056 | 12/1887 | Dunstedter | 301/63 DD |
| 556,121 | 3/1896 | Wolff | 301/105 B |
| 2,606,076 | 8/1952 | Frazer | 301/63 PW |
| 4,198,878 | 4/1980 | Lewis et al. | 74/572 |
| 4,413,860 | 11/1983 | Prescott | 301/63 PW |

FOREIGN PATENT DOCUMENTS

| 3531541 | 3/1986 | Fed. Rep. of Germany | 301/63 DD |
| 330414 | 8/1903 | France | 301/63 DD |
| 82401 | 5/1985 | Japan | 301/63 PW |
| 26282 | of 1902 | United Kingdom | 301/55 |
| 135003 | 7/1919 | United Kingdom | 301/63 DD |
| 2180510 | 4/1987 | United Kingdom | 301/105 R |

Primary Examiner—Robert B. Reeves
Assistant Examiner—Frank H. Williams, Jr.
Attorney, Agent, or Firm—Lilling & Greenspan

[57] ABSTRACT

A bicycle wheel includes a rim, a spindle and a hub articulately mounted on the spindle. A first pair of sections with opposite-hand threads are located symmetrically on the middle portion of the hub. A second pair of sections having opposite-hand threads of less diameter than those of the first sections is located on the hub at the end of the hub. Adjacent threads between the first and second sections are opposed in direction, and carry first and second flanges respectively. Situated on opposite sides of the hub are reinforced composite material diaphragms, shaped as an annulus, and interposed between the first and second flanges. The diaphragms are rigidly coupled with their inner side to the first and second flanges, and with their outer side to the rim.

1 Claim, 1 Drawing Sheet

U.S. Patent
Jul. 4, 1989
4,844,552
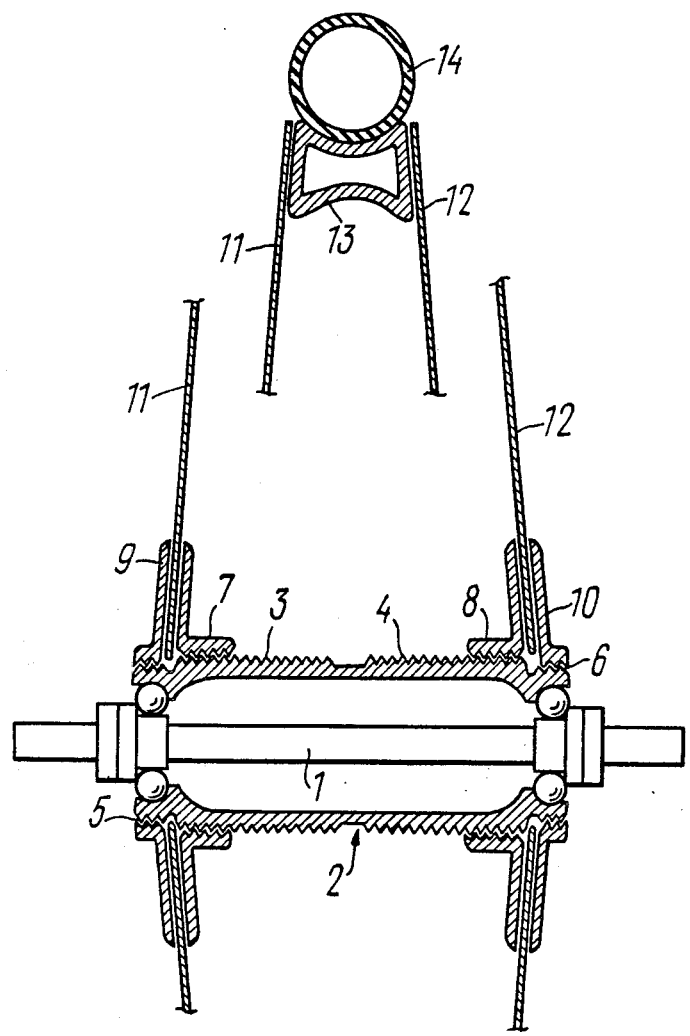

BICYCLE WHEEL

FIELD OF THE INVENTION

The present invention relates to bicycles and more specifically to bicycle wheels.

The invention is most expediently applicable in track racing and touring bicycles, wherein high aerodynamic bicycle characteristics are involved.

DESCRIPTION OF THE PRIOR ART

Known in the present state of the art is a bicycle wheel, comprising a spindle on which a hub is articulately mounted, said hub having two flanges connected, through intermediate elements, to the rim carrying the tire. The intermediate elements are shaped as convex side members made up of disks featuring a three-ply honeycomb construction provided with coverings of a composite polymeric material (e.g., carbon-reinforced plastic, organic plastic, glass-reinforced plastic) ('Ambrosio'—'Realizzazione di ruota lenticolare con materiali compositi avanzati. La tecnica aeronautica al servizio del ciclismo'. Milano, 1984).

The process for production of such bicycle wheels is as follows; a reinforcing filler (i.e., a textile material based on carbon, organic, or glass fibres) is impregnated with curable epoxy resin, dried, whereupon a three-ply honeycomb construction of a side member is prepared from cut-out blanks cemented on a form pattern following the outside contour of the convex side members. Then the side member is molded and the binder is cured in a digester. The thus-obtained side members are pasted, or attached by any other method, to the hub rim and flanges.

Such a bicycle wheel features relatively high aerodynamic properties, while the process for its production is instrumental in obtaining wheels for track and road-racing bicycles.

However, the aforediscussed bicycle wheel provided with side members from three-ply honeycomb structures features but a considerable weight (up to 2950 g), whereas any reduction of its weight due to a decreased thickness of the side-member walls involves loss of rigidity by the bicycle wheel.

It ensues from the foregoing that such a bicycle wheel is too labor-consuming in manufacture as the production process includes a great many operations, i.e., making a honeycomb filler, preparing a press-mold following the shape of the outside contour of the side members, and a two-stage cementing of the honeycomb filler with the coverings. In addition, manufacture of the side members can be effected only at specialized factories engaged in processing of high-strength composite polymeric materials and equipped with specially designed highly expensive production facilities, such as plants for production of the honeycomb filler, machines for mechanical processing of the honeycomb filler along a double-curvature contour, and digesters.

Moreover, the bicycle wheel should feature variable rigidity so as to suit the cyclist's weight, the wheel rigidity depending largely upon the rigidity of its side members. Higher rigidity of the known bicycle wheel is attained only due to modified construction of the side members themselves, that is, increasing their thickness introducing additional structural rigidity elements, and the like. Thus, to modify the rigidity of a bicycle wheel, new side members are to be made.

Thus, the bicycle wheel discussed above has considerable weight, is complicated in manufacture and requires a great deal of materials for making the side member to suit the load on the bicycle wheel.

Another prior-art bicycle wheel is known to comprise a spindle, whereon a hub is articulately mounted. The hub has symmetrically arranged sections provided with opposite-hand thread on which flanges are mounted. The flanges are associated, through intermediate elements, that is, spokes, with the rim carrying the tire (U.S. Pat. No. 2,246,492).

The bicycle wheel mentioned above is less in weight than that having intermediate elements shaped as convex side members. The wheel construction enables the hub to be replaced without dismantling the rim and spokes.

However, the aerodynamic characteristics of such a bicycle wheel is rather low, since the spokes offer high resistance to the motion of the bicycle wheel.

OBJECT AND SUMMARY OF THE INVENTION

It is an object of the present invention to reduce the weight of a bicycle wheel.

It is another object of the invention to provide better aerodynamic characteristics of a bicycle wheel.

It is one more object of the invention to provide simpler adjustment of the bicycle wheel for rigidity to suit the cyclist's weight.

It is still one more object of the invention to provide simpler production technology for the intermediate elements of a bicycle wheel.

With the foregoing and other objects, in a bicycle wheel, comprising a spindle, whereon a hub is articulately mounted, said hub being provided with symmetrically arranged first sections having opposite-hand threads, on which are mounted first flanges, which are linked, through intermediate elements, to a rim carrying a tire, according to the invention, the intermediate element is, on either side, essentially an annular diaphragm made up of a reinforced composite material, and provision is made at the hub ends for second lesser-diameter sections, each having a thread of the hand opposite to the hand of thread on the adjacent hub section, and second flanges are mounted with a clearance relative to the first flanges, while the annular diaphragms are interposed between the first and second flanges and are coupled rigidly with both.

To ensure against corrugation of the annular diaphragm and, thereby, to improve the aerodynamic characteristics of the bicycle wheel, it is expedient that each of the annular diaphragms should feature such a reinforcement pattern as to provide the Poisson's ratio of the composite material ranging within 0.8 and 1.5.

The bicycle wheel, according to the invention has comparatively small weight, contributes to better aerodynamic characteristics of the wheel, simpler rigidity adjustment to suit the cyclist's weight and the diaphragm production technology.

BRIEF DESCRIPTION OF THE DRAWING

Given below is a specific embodiment of the present invention, with reference to the accompanying drawing, wherein a schematic axially sectional view of a bicycle wheel is represented, according to the invention.

DESCRIPTION OF THE SPECIFIC EMBODIMENT

The bicycle wheel comprises a spindle 1, whereon a hub 2 is articulately mounted. The hub 2 has symmetrically arranged first sections 3, 4 situated closer to the hub middle portion and provided with opposite-hand threads, while provided at the ends of the hub 2 are second sections 5, 6 of a diameter less than the diameter of the first sections 3, 4, said sections 5, 6 having opposite-hand threads. The hand of the thread on the second sections 5, 6 is opposite to the hand of thread on the respective adjacent sections 3, 4. For example the thread directions on sections 5,3,4 and 6 are left-handed, right-handed, left-handed and right handed respectively, as noted by initials LH and RH on the FIGURE. The first sections 3, 4 of the hub 2 carry respective first flanges 7, 8, and the second sections 5, 6 carry respective second flanges 9, 10 spaced with some clearance apart from the first flanges 7, 8. Annular diaphragms 11, 12 are interposed in the clearances between the adjacent flanges 7, 9 and 8, 10, respectively. On their inner side the annular diaphragms 11, 12 are rigidly coupled to the adjacent flanges 7, 9 and 8, 10, respectively, while on their outer side the diaphragms are rigidly linked to a rim 13. A rubber tire 14 is set on the rim 13.

The annular diaphragms 11, 12 are made up of a number of layers of a reinforcing filler (e.g., a carbon tape, organic or glass fabric) impregnated with a curable synthetic binder, such as an epoxy resin one, the reinforcing pattern of the composite material providing the Poisson's ratio of the composite material ranging within 0.8 and 1.5.

The annular diaphragms 11, 12 are expanded as follows. The first flanges 7, 8 are screwed onto the hub 2 until they assume a position, wherein the outer surfaces of the first flanges 7, 8 be coplanar with the respective side surfaces of the rim 13. Then the annular diaphragms 11, 12 with the hub 2 interposed therebetween, are cemented to the side surfaces of the rim 13. Once the annular diaphragms 11, 12 have been pasted to the rim 13, a liquid synthetic adhesive, e.g., an epoxy one, is applied to the outer surface of the first flanges 7, 8 and to the inner surface of the annular diaphragms 11, 12, adjacent to said flanges. While keeping the first flanges 7, 8 against turning, one should rotate the hub 2, thus bringing the first flanges 7, 8 in opposite directions towards the ends of the hub 2. As a result, the annular diaphragms 11, 12 get outwardly expanded, thus imparting the required rigidity to the bicycle wheel. Once the annular diaphragms have been expanded, the second flanges 9, 10 are screwed onto the hub 2, which have the opposite-hand threads with respect to the threads on their respective adjacent first flanges 7, 8, whereupon the flanges are cemented to the annular diaphragms 11, 12. Thus, the first flanges 7, 8 get secured to the hub 2 due to their being cemented to the second flanges 9, 10 through the respective annular diaphragms 11, 12.

Expansion of the annular diaphragms 11, 12 by the first flanges 7, 8 is accompanied by compression of the rim 13. It has been established experimentally that when expanding the annular diaphragms 11, 12 made of a reinforced composite material and featuring a reinforcing pattern that provides for the Poisson's ratio of the composite material below 0.8, radial creases result, which deteriorate the aerodynamic characteristics of the bicycle wheel. When the annular diaphragms 11, 12 are made from a polymeric anisotropic composite material having the Poisson's ratio within 0.8 to 1.5, which is attained due to an appropriate reinforcing pattern of the composite material, no creases occur during expansion of the annular diaphragms 11,12. As theoretical calculations have demonstrated, the limit value of the Poisson's ratio for isotropic material equals 0.5, that for anisotropic composite materials is equal to 2.0.

Thanks to the fact that the annular diaphragms 11, 12 are made of a reinforced composite sheet materials 0.1 to 0.3 mm thick, the weight of a bicycle wheel, according to the invention, lies within 0.7 to 1.2 kg depending on the wheel diameter and material of the annular diaphragms 11, 12.

The bicycle wheel of the invention can be made at any factory engaged in production of polymeric composite materials, since the production process involves no special equipment or highly expensive accessories and tooling.

The degree of rigidity of the bicycle wheel, according to the invention, is adjusted to suit the cyclist's weight by merely changing the degree of expansion of the annular diaphragms 11, 12, which is attained by a greater or lesser setting of the first flanges 7, 8 apart from each other on the hub 2 with modifying neither construction nor material of the annular diaphragms 11, 12.

Trials of pilot specimens of bicycle wheels, made according to the invention, performed by cyclists, demonstrated the following advantages of the present wheel over those known heretofore, including bicycle wheels manufactured by Ambrosio Co.: weight reduction by 2 to 2.5 times, simplified production technology, simplified adjustment of wheel rigidity to suit the cyclist's weight, improvement in the aerodynamic properties of the present bicycle wheel.

What is claimed is:

1. A bicycle wheel, comprising:
   a rim;
   a spindle;
   a hub articulately mounted on said spindle; first sections having opposite-hand threads, provided on said hub and arranged symmetrically; second sections included on the hub, said second sections having opposite-hand threads, provided at the ends of said hub and having a diameter smaller than the diameter of said first sections, the thread on said second sections having an opposite hand with respect to the hand of thread on an adjacent section of said first sections;
   first flanges mounted on said first sections;
   second flanges mounted on said second sections with a clearance relative to said respective first flanges;
   diaphragms shaped as an annulus and made of a reinforced composite material, said diaphragms being situated on the opposite sides of said hub, interposed between said first and said second flanges and rigidly coupled to said first flanges with their inner edges, for reversibly expanding said diaphragms, and
   with their outer edges, said diaphragms being rigidly linked to said rim;
   said second flanges being adjustable for clamping said diaphragms and securing said first flanges, and
   a tire mounted on said rim.

* * * * *